United States Patent
Baracca et al.

(10) Patent No.: US 11,300,158 B2
(45) Date of Patent: Apr. 12, 2022

(54) SMALL CROSS-SECTION BEARING UNIT

(71) Applicant: Aktiebolaget SKF, Gothenburg (SE)

(72) Inventors: Fausto Baracca, Massa (IT); Andrea A Bertolini, Carrara (IT); Fabio Falaschi, Carrara (IT); Pasquale Frezza, Aversa (IT); Alessio Nebbia Colomba, Pisa (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/919,734

(22) Filed: Jul. 2, 2020

(65) Prior Publication Data
US 2021/0010540 A1 Jan. 14, 2021

(30) Foreign Application Priority Data
Jul. 12, 2019 (IT) .......................... 102019000011646

(51) Int. Cl.
*F16C 19/06* (2006.01)
*F16C 33/80* (2006.01)
*F16C 33/78* (2006.01)

(52) U.S. Cl.
CPC .............. *F16C 33/80* (2013.01); *F16C 19/06* (2013.01); *F16C 33/7846* (2013.01)

(58) Field of Classification Search
CPC .. F16C 19/06; F16C 33/7846; F16C 33/7886; F16C 33/80
See application file for complete search history.

(56) References Cited

U.S. PATENT DOCUMENTS

| | | | | |
|---|---|---|---|---|
| 3,350,148 A * | 10/1967 | Sanguinetti | ............. | F16C 33/80 384/488 |
| 6,179,472 B1 * | 1/2001 | Gilliland | ................. | F16C 33/80 384/477 |
| 6,402,158 B1 * | 6/2002 | Imazaike | ............ | F16C 33/7846 277/549 |
| 9,587,678 B2 * | 3/2017 | Moratz | ............... | F16C 33/7846 |
| 2015/0176654 A1 * | 6/2015 | Back | .................... | F16C 33/7806 384/480 |
| 2016/0076594 A1 * | 3/2016 | Moratz | ............... | F16C 33/7846 384/484 |

FOREIGN PATENT DOCUMENTS

| | | | |
|---|---|---|---|
| DE | 102012215967 A1 | 3/2014 | |
| GB | 1531270 A * | 11/1978 | .............. F16C 19/52 |

(Continued)

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

Small cross-section bearing unit having a flanged outer ring, an inner ring coaxial with the outer ring and an axis of rotation, a plurality of rolling elements arranged between the inner ring and the outer ring so as to allow the relative rotation thereof about the axis, and a sealing device for preventing the entry of contaminants and, at the same time, for preventing the leakage of a lubricating grease from the inside of the bearing unit; the sealing device being provided, on each side of the bearing unit, with a shaped sealing screen that is supported rotatably about the axis by the outer ring, and a labyrinth seal extending along a respective complex winding path defined by an associated sealing screen and by the inner ring.

3 Claims, 1 Drawing Sheet

(56) References Cited

FOREIGN PATENT DOCUMENTS

| | | | | |
|---|---|---|---|---|
| JP | 2005315313 A | * | 11/2005 | .......... F16C 33/7853 |
| JP | 2012197867 A | * | 10/2012 | ............ F16C 33/782 |
| JP | 2014009707 A | | 1/2014 | |
| WO | WO-2016083133 A1 | * | 6/2016 | .......... F16C 33/7826 |
| WO | 2016188400 A1 | | 12/2016 | |

* cited by examiner

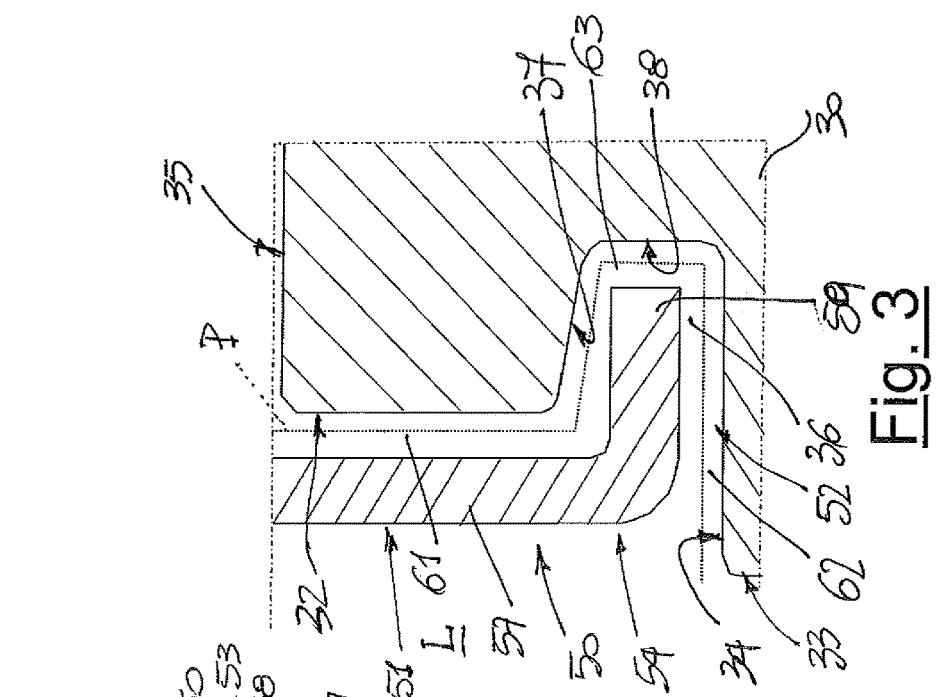

SMALL CROSS-SECTION BEARING UNIT

CROSS-REFERENCE TO RELATED APPLICATIONS

This application claims priority to Italian Patent Application Number 102019000011646, filed Jul. 12, 2020, the contents of which is fully incorporated herein by reference.

TECHNICAL FIELD OF THE INVENTION

The present invention relates to a bearing unit with a small cross-section.

BACKGROUND OF THE INVENTION

The small cross-section bearing units of the known type are suitable for applications where the axial dimensions are very compact or where the weight must be limited and generally comprise an outer ring, an inner ring, a plurality of rolling elements arranged between the inner ring and the outer ring so as to allow the relative rotation thereof about an axis of rotation and, on each side of the bearing, a sealing device for preventing the entry of contaminants inside the bearing unit and, at the same time, preventing the leakage of lubricating grease from the inside of the bearing unit.

Since they may have very small axial dimensions, the bearing units of the type described above may be advantageously used in marble cutting machines, the machining action of which generates very fine abrasive dust which manages to penetrate easily inside the bearing units, significantly reducing their working life.

SUMMARY OF THE INVENTION

The object of the present invention is to provide a small cross-section bearing unit which, while maintaining its principle characteristics of being thin, also has a long working life when used in particularly aggressive environments such as those of marble cutting machines.

According to the present invention a small cross-section bearing unit having a flanged outer ring, an inner ring coaxial with the outer ring and an axis of rotation, a plurality of rolling elements arranged between the inner ring and the outer ring so as to allow the relative rotation thereof about the axis, and a sealing device for preventing the entry of contaminants and, at the same, time, for preventing the leakage of a lubricating grease from the inside of the bearing unit; the bearing unit being characterized in that the sealing device comprises, on each side of the bearing unit, a shaped sealing screen which is supported rotatably about the axis by the outer ring, and a labyrinth seal extending along a respective complex winding path defined by an associated sealing screen and by the inner ring is provided.

BRIEF DESCRIPTION OF THE DRAWINGS

The invention will now be described with reference to the accompanying drawings which illustrate a non-limiting example of embodiment thereof, in which:

FIG. 1 is a perspective view of a preferred embodiment of the small cross-section bearing unit according to the present invention;

FIG. 2, shows on a larger scale and cross-sectioned, the bearing unit according to FIG. 1; and FIG. 3, shows on a larger scale, a detail of the small cross-section bearing unit according to FIG. 2.

DETAILED DESCRIPTION OF THE INVENTION

With reference to FIGS. 1 and 2, 10 denotes in its entirety a bearing unit with a small cross-section which therefore has very compact axial dimensions and which comprises a flanged outer ring 20, an inner ring 30 coaxial with the outer ring 20 and an axis X of rotation, and a plurality of rolling elements 40, preferably balls, which are arranged between the inner ring 30 and the outer ring 20 so as to allow the relative rotation thereof about the axis X.

In the whole of the present description and in the claims, terms and expressions which indicate positions and directions, such as "radial", "axial" or "transverse", are to be understood as referring to the axis X of rotation.

In the bearing unit 10 according to the present invention, the flanged outer ring 20 is a rotating ring and is provided with a central radially inner raceway 21 for the rolling elements 40 and, on each side L of the bearing unit 10, with an annular recess 22 which is radially open towards the axis X and axially towards the outside of the bearing unit 10, is formed in the flanged outer ring 20, extending from a respective outer annular surface 23 which axially delimits the flanged outer ring 20, and is radially delimited towards the outside of the outer ring 20 by a cylindrical surface 24, and axially towards the inside, namely towards the raceway 21, by an annular surface 25 which is transverse to the axis X. The two annular recesses 22 are arranged axially on the opposite sides of the raceway 21 and are a mirror-image of each other.

In the bearing unit 10 according to the present invention, the inner ring 30 is a non-rotating ring and is provided with a central radially outer raceway 31 for the rolling elements 40 which radially faces the raceway 21. On each side L of the bearing unit 10, the inner ring 30 is axially delimited by two annular surfaces 32 and 33 which are arranged in series from the outside of the bearing unit 10 towards the axis X and the two surfaces 33 of which are axially inset with respect to the surfaces 32, which are substantially axially aligned with the surfaces 23 of the outer ring 20. Moreover, on each side L of the bearing unit 10, the inner ring 30 is radially delimited by two cylindrical surfaces 34 and 35 which are arranged in series from the outside of the bearing unit 10 towards the axis X and the two surfaces 35 of which are arranged directly on opposite sides of the raceway 31 and axially delimited towards the outside of the bearing unit 10 by the surfaces 33; while the surfaces 34 are axially delimited towards the outside of the bearing unit 10 by the surfaces 32. Finally, again on each side L of the bearing unit 10 and as shown more clearly in FIG. 3, the inner ring 30 comprises a cylindrical lateral groove 36 formed across the surface 33 axially towards the inside of the bearing unit 10: each groove 36 is radially delimited towards the inside, namely towards the axis X, by the associated surface 34, is radially delimited towards the outside, namely on the opposite side with respect to the axis X, by a conical surface 37 which emerges and gradually opens out towards the associated surface 33, and, finally is axially delimited towards the inside of the inner ring 30 by an annular surface 38 which is transverse to the axis X and intercepts both the surface 34 and the surface 37, to which surfaces it is preferably, but not necessarily, also connected.

According to the present invention, the small cross-section bearing unit 10 further comprises a sealing device 50 for preventing the entry of contaminants inside it, namely between the raceways 21 and 31 where the rolling elements 40 travel and, at the same time, for preventing the leakage of lubricating grease, again from the inside of the bearing unit 10. The sealing device 50 comprises, on each side L of the bearing unit 10, a respective shaped screen 51 which is supported rotatably about the axis X by the outer ring 20, and a respective labyrinth seal 52 which is defined, as will be more clearly described below, by each screen 51 and by the inner ring 30.

Each screen 51 comprises two annular edges 53 and 54 which have ends with a substantially L-shaped cross-section and the edge 53 of which is a radially outer edge and is engaged inside the associated annular recess 22 so as to be keyed onto the associated outer annular surface 23 and positioned in axial abutment against the associated annular surface 25, while the edge 54 is a radially inner edge and is inserted freely, namely without any contact, inside the associated groove 36. In particular, each edge 53 comprises a respective cylindrical portion 55 which is keyed onto the associated surface 23 and a respective flanged portion 56 which is transverse to the axis X and arranged in axial abutment against the associated annular surface 25, while each edge 54 comprises a respective flanged portion 57 which is transverse to the axis X and is substantially axially coplanar with the associated surface 23 and connected to the associated flanged portion 56 by means of a conical portion 58, and a respective cylindrical portion 59 which is supported freely at the end of the flanged portion 57 opposite to the end connected to the conical portion 58.

Each edge 53 defines with the inner ring 30 and, in particular with the associated groove 36, a respective multi-stage labyrinth seal 52 comprising:

a respective radially inner annular stage and/or channel 61 communicating with the inside of the bearing unit and axially delimited by an associated flanged portion 57 and by an associated surface 33, a respective radially outer cylindrical stage and/or channel 62 communicating with the outside of the bearing unit and radially delimited by an associated cylindrical portion 59 and by an associated surface 34, and a respective intermediate shaped stage and/or channel 63 between an associated annular channel 61 and an associated channel 62 and defined by an associated cylindrical portion 59 and by the associated surfaces 37 and 38.

Owing to the particular configuration of the bearing unit 10 and also the screens 51, the stages and/or channels 61, 63 and 62 have an extremely small opening and are therefore particularly difficult to penetrate into, namely they have a high sealing capacity able to prevent contamination by contaminating agents outside the bearing unit 10. Moreover, the innovative configuration of each screen 51 and its free positioning inside the associated groove 36 result in a succession of stages and/or channels 61, 63 and 62 along a relatively complex and in particular winding path P which, as mentioned hitherto, not only is difficult to penetrate into, but also cannot be easily passed along by the lubricating grease contained inside the bearing unit 10, thereby preventing any leakage of lubricating grease. Basically, the capacity to retain the lubricating grease inside the bearing unit 10 is favoured both by the linear extension of the path P and by the extremely small opening of the stages and/or channels 61, 63 and 62, since both these factors which represent characterizing features of the present invention help increase the head loss of the lubricating grease along the path P, namely help make the leakage of the lubricating grease from the bearing unit 10 particularly unlikely. It should also be emphasized that the sealing capacity of each labyrinth seal 52 is further increased, during use, by the relative movement of the associated shaped screen 51 which is supported rotatably about the axis X by the outer ring 20, relative to the non-rotating, fixed, inner ring 30. This relative movement generates, at least inside the stages and/or channels 61 and 63, a centripetal effect which helps push the lubricating grease towards the inside of the bearing unit 10, therefore preventing any leakage thereof.

In order to increase further the advantages of the present invention, namely in particular the lubricating grease retaining capacity, and making use also of the relatively long extension of the path P, the channel 63, along the part delimited by the surface 37, has a section which is inclined with respect to the axis X with an average inclination which decreases from the outside of the bearing unit 10 and which further increases the force pushing the lubricating grease towards the inside of the bearing unit 10.

From the above it is clear that, by creating a path P which makes advantageous use of the interpenetration of each edge 54, or rather, of a part of the edge 54 defined by the portion 59, with the associated groove 36 which extends axially inside the inner ring 30, it is possible to create a path P of the labyrinth seal 52 which is relatively long, without however having to increase the axial width of the bearing unit 10, which therefore remains particularly small and suitable for the uses for which it is intended.

In addition to the embodiments of the invention, as described above, it is to be understood that numerous further variants are possible. It must also be understood that the embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

The invention claimed is:

1. A cross-section bearing unit comprising:
a flanged outer ring,
an inner ring coaxial with the outer ring, the inner ring having first and second axial ends, a radially outermost outer surface, and a radially innermost outer surface, the inner ring defining a groove in each of the first and second axial ends, the groove being radially spaced from the radially outermost outer surface and from the radially innermost outer surface,
an axis of rotation,
a plurality of rolling elements arranged between the inner ring and the outer ring so as to allow the relative rotation thereof about the axis, and a sealing device for preventing the entry of contaminants and, at the same, time, for preventing the leakage of a lubricating grease from the inside of the bearing unit; further comprising
on each side of the bearing unit, a shaped sealing screen that is supported rotatably about an axis by the outer ring, and a labyrinth seal extending along a respective winding path defined by the shaped sealing screen and by the inner ring, wherein the shaped sealing screen is single-component unitary member, the shaped sealing screen having an end which is positioned inside of the groove of the associated one of first and second axial ends.

2. The cross-section bearing unit according to claim 1, wherein the labyrinth seal is a multi-stage labyrinth seal comprising an intermediate shaped stage provided with a section inclined with respect to the axis with an average inclination which decreases from the outside of the bearing unit.

3. The cross-section bearing unit according to claim 2, wherein the labyrinth seal comprises a radially inner stage communicating with the inside of the bearing unit and a radially outer stage communicating with the outside of the bearing unit, the radially inner and outer stages being arranged along the path on opposite sides of the shaped stage; the radially inner stage, the radially outer stage, and the shaped stage have an opening and together helping to extend the length of the path.

* * * * *